A. A. BALL, Jr.
STARTING AND STOPPING MECHANISM.
APPLICATION FILED NOV. 14, 1908.

1,084,526.

Patented Jan. 13, 1914.
4 SHEETS—SHEET 2.

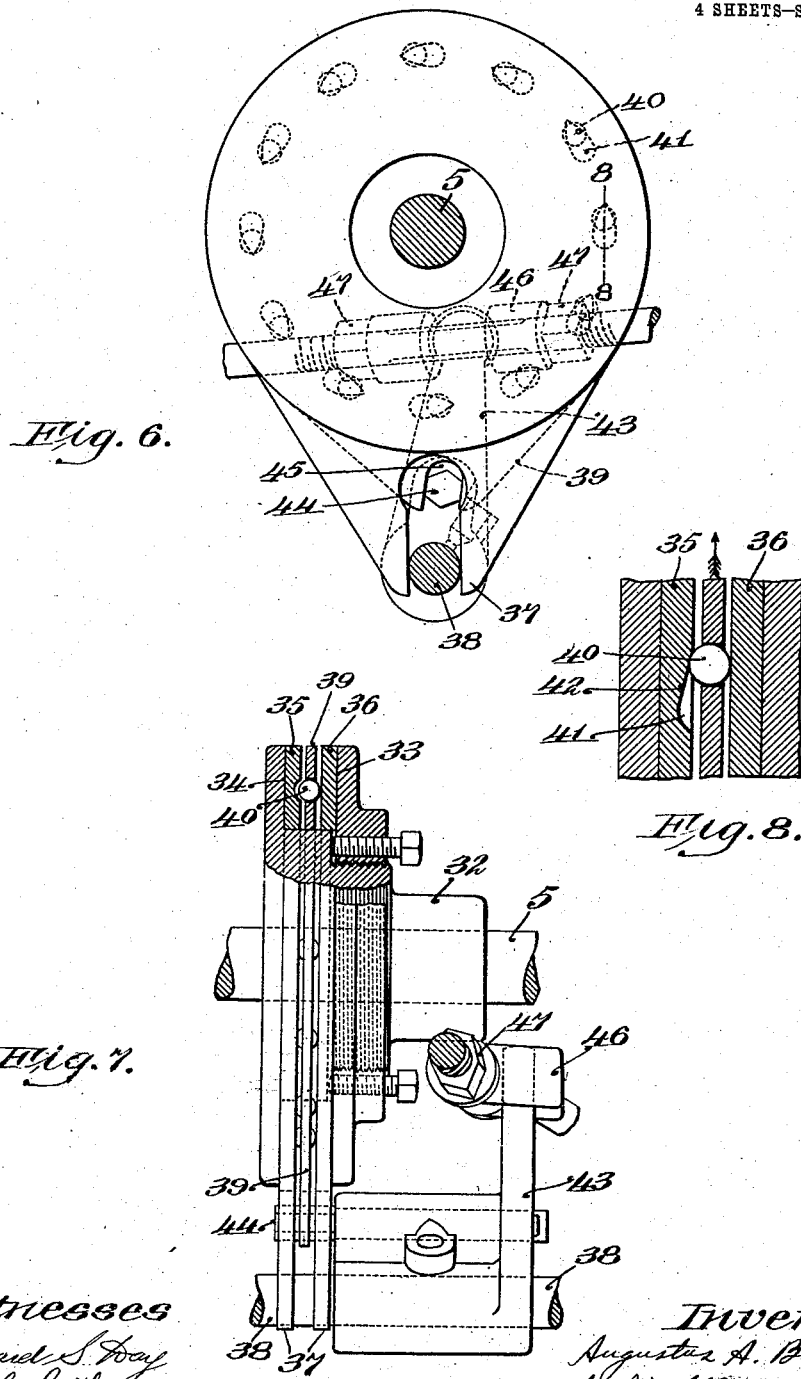

UNITED STATES PATENT OFFICE.

AUGUSTUS A. BALL, JR., OF LYNN, MASSACHUSETTS, ASSIGNOR TO UNITED SHOE MACHINERY COMPANY, OF PATERSON, NEW JERSEY, A CORPORATION OF NEW JERSEY.

STARTING AND STOPPING MECHANISM.

1,084,526.

Specification of Letters Patent.

Patented Jan. 13, 1914.

Application filed November 14, 1908. Serial No. 462,665.

*To all whom it may concern:*

Be it known that I, AUGUSTUS A. BALL, Jr., a citizen of the United States, residing at Lynn, in the county of Essex and State of Massachusetts, have invented certain new and useful Improvements in Starting and Stopping Mechanism; and I do hereby declare the following to be a full, clear, and exact description of the invention, such as will enable others skilled in the art to which it appertains to make and use the same.

The invention relates to mechanism for controlling the starting and stopping of the driving shaft or other rotary element through which the operating parts of the machine are driven, and more especially to mechanism which is adapted for use in controlling the operation of machines, such for instance, as sole molding, direct pressure sole leveling, or sole laying machines, in which the driving mechanism is manually thrown into operation through a treadle or similar device.

The object of the invention is to provide a controlling mechanism having its parts constructed and arranged in an improved and simplified manner, and having an improved mode of operation whereby the driving mechanism may be thrown into operation with comparatively little exertion on the part of the operator, and whereby the stopping may be selectively controlled either automatically or by the operator.

To these ends the various features of the invention contemplate the provision of improved devices for connecting a starting treadle and driving clutch, of improved mechanism for applying a brake in disengaging the clutch and for releasing the brake in engaging the clutch, of improved devices for automatically disengaging the clutch, and of improved devices for enabling the operator to render the automatic stopping devices inactive, and to manually control the operation of the driving mechanism or of the driving mechanism and brake.

The various features of the invention will be readily understood from an inspection of the accompanying drawings, in which—

Figure 1:
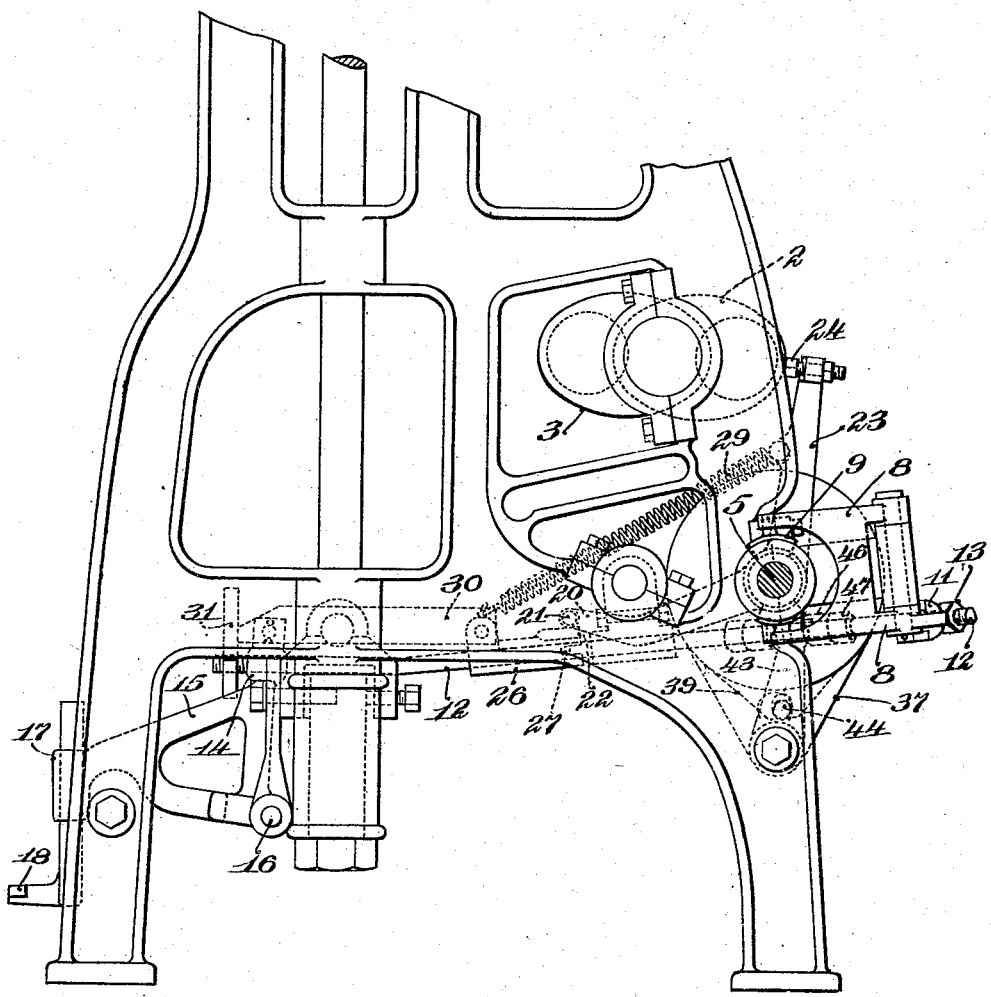
Figure 2:
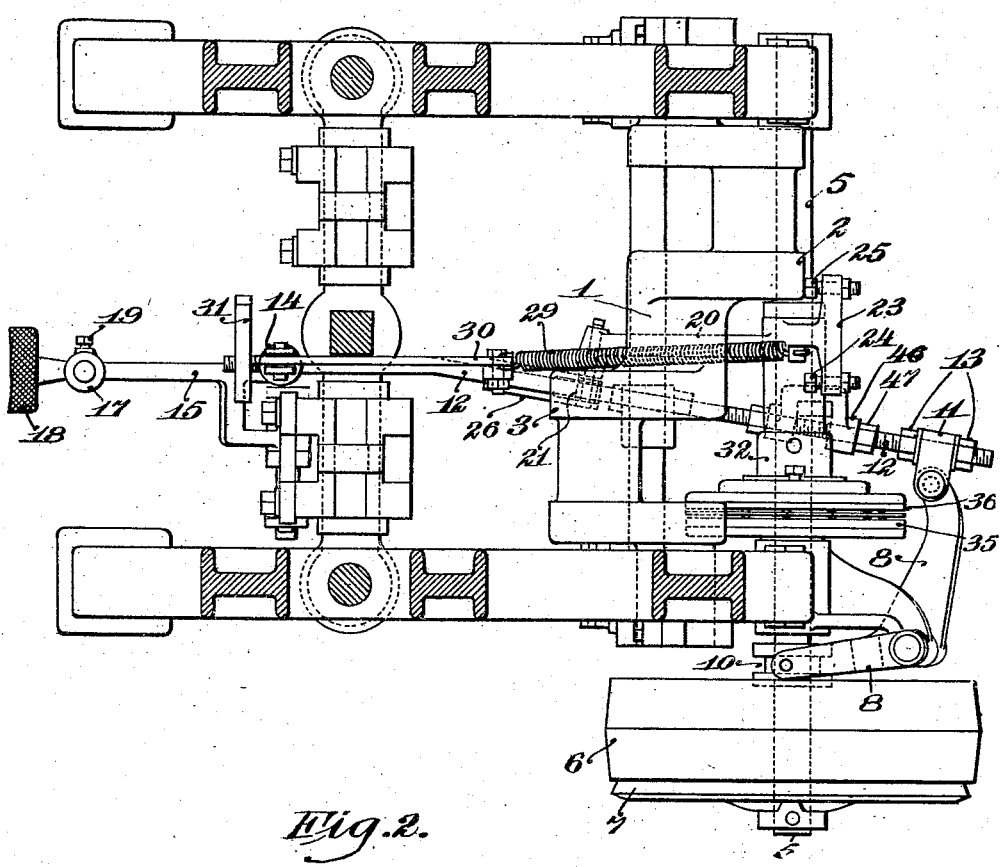
Figure 3:
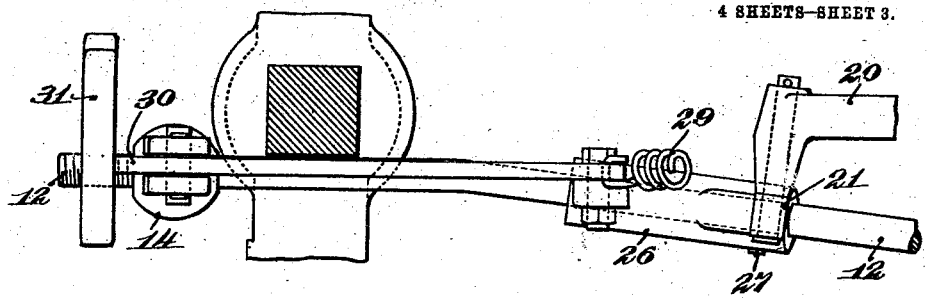
Figure 4:
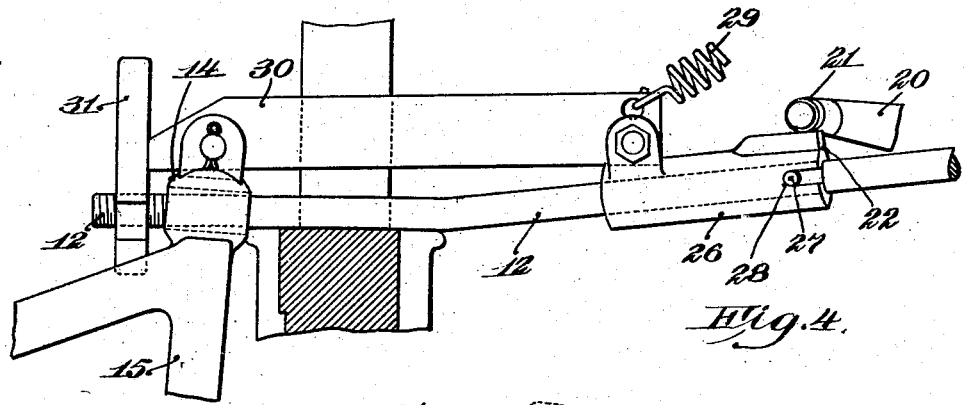
Figure 5:
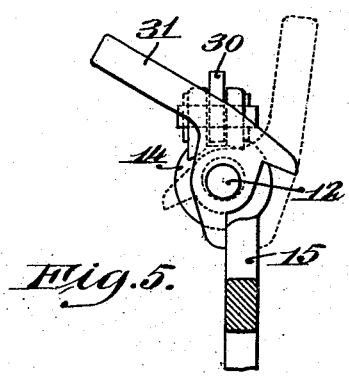

Figure 1 is a side elevation of a machine embodying the various features of the invention in their preferred form; Fig. 2 is a sectional plan view of the mechanism shown in Fig. 1; Fig. 3 is a plan view of the device for automatically disengaging the clutch and applying the brake; Fig. 4 is a side elevation of the devices shown in Fig. 3; Fig. 5 is a detail view showing the latching device which retains the automatic stopping devices either in or out of working relation; Fig. 6 is a side elevation of the brake; Fig. 7 is a sectional elevation looking from right to left in Fig. 6; and Fig. 8 is a sectional detail on line 8—8, Fig. 6.

In the drawings the various features of the invention are shown embodied in a well known type of machine for operating upon shoe soles, in which two sets of devices for subjecting the soles to pressure are alternately actuated through two cranks and connected toggles. It will be understood, however, that the invention is not limited in its application to such machines, but may be used in various other types of machines.

In the machine shown in the drawings the crank shaft is indicated at 1, and is provided with two cranks 2 and 3 arranged at an angle of 180° to each other, as is usual in this type of machines. The toggles and links connecting the toggles with the cranks have been omitted for the sake of clearness.

The crank shaft is driven from a driving shaft 5 through the usual gearing (not shown). The shaft 5 is driven through a pulley 6 which is mounted to revolve freely on the shaft, and to move longitudinally thereon. The pulley is provided with a friction surface forming one member of a clutch, the other member 7 of which is connected to rotate with the shaft 5. The pulley 6 is shifted to engage and disengage the clutch through a bell crank lever 8, one end of which is connected with the pulley 6 by means of shoes 9 which engage an annular groove 10 formed in the hub of the pulley. The other end of clutch lever 8 is pivotally connected to a block 11 which is adjustably secured upon the end of an actuating rod 12, the block being held in adjusted position by means of the nuts 13. The front end of the rod 12 passes through an opening formed in a boss 14 on the upper end of a treadle lever 15. The treadle lever is pivoted at 16 to the frame of the machine, and is provided at its front end with a boss 17 in which a treadle 18 is adjustably secured by means of a set screw 19. By means of the adjustable connection between the treadle and the treadle lever, the vertical position of the treadle may be adjusted to vary the distance between the treadle and the floor to suit the convenience of the operator.

When the treadle is depressed the clutch is engaged to start the machine. The disengagement of the clutch may be controlled through the treadle, so that the operator may stop the machine at will by releasing the treadle, or may be controlled automatically so that the machine will be stopped at a predetermined point in its operation without the attention of the operator. During the normal operation of machines of the type illustrated, the machine should be stopped after the crank shaft has made a half revolution and when the cranks are in the relative positions shown in Fig. 1. The automatic stopping devices illustrated are accordingly constructed and timed to disengage the clutch and stop the machine at each half revolution of the crank shaft. The automatic control of the driving mechanism is secured by locking devices which lock the clutch in engagement after it has been engaged by the depression of the treadle, and which are automatically operated after the crank shaft has made a half revolution to release the clutch so that it is disengaged.

In the construction shown, the devices for locking the clutch in engagement comprise a locking lever arranged to engage a shoulder on the starting mechanism and hold the clutch in engagement, and means for automatically disengaging the lever from the shoulder. In order that the locking devices may be rendered active or inactive at the will of the operator, provision is made for varying the relative movement between the locking lever and the shoulder produced by the depression of the treadle, the parts being so set by the operator that the relative movement between the shoulder and lever is such that the lever does not engage the shoulder in case the automatic stop devices are not to be used, and being so set that the relative motion is such that the lever engages the shoulder when the treadle is depressed in case the automatic stop devices are to be used.

As shown in the drawings, the locking lever 20 is pivotally supported on the driving shaft 5, and is provided at its forward end with a roll 21 arranged to coöperate with a shoulder 22 on the clutch actuating mechanism. The vertical arm 23 of the locking lever is provided with two adjustable screws 24 and 25 arranged to be engaged by the cranks 3 and 2 respectively. The shoulder 22 which coöperates with the forward end of the locking lever is formed by the rear end of a sleeve 26 which is mounted upon the clutch actuating rod 12. The rearward movement of the sleeve with relation to the rod is determined by a stop pin 27 projecting from the rod, and arranged to engage the end of a slot 28 formed in the sleeve. The sleeve and locking lever are connected by a spring 29 which acts to retain the vertical arm of the lever in position to be engaged by the cranks, and also forces the sleeve 26 and the rod 12 in a direction to hold the clutch out of engagement. The sleeve 26 is connected by means of a link 30 with the upper end of the treadle lever 15, and a latch lever 31 is mounted on the forward end of the rod 12, so that it may be set in position to engage the front end of the link 30, or in position where it will not interfere with the forward movement of the link 30. The forward end of the link 30 projects somewhat beyond the boss 14 on the treadle lever, and forms a stop for preventing lost motion between the treadle lever and the rod 12 when the latch lever 31 is in position to be engaged by the end of the link.

When the automatic stopping devices are to be rendered inactive, the latch lever 31 is set in the position indicated in the drawings. When in this position, it acts to retain the sleeve 26 in its rearward position on the rod 12 when the treadle is depressed, and the sleeve and rod move forward in unison when the treadle is depressed to start the machine, or is released to disengage the clutch and stop the machine. In this case the forward movement imparted to the sleeve 26 by the depression of the treadle is not sufficient to bring the shoulder 22 in front of the roll 21, and the locking devices are therefore maintained out of working relation so long as the latch lever 31 remains in the position indicated in the drawings, and the starting and stopping of the machine is controlled by the operator through the treadle. When the automatic stopping devices are to be thrown into action, the operator sets the latching lever 31 in the position indicated in dotted lines in Fig. 5, so that it is not in front of the link 30. Now when the treadle is depressed in starting the machine, the sleeve 26 is moved forward on the actuating rod 12 until the boss 14 engages the lever 31, and then during the continued movement of the treadle in engaging the clutch the sleeve is moved with the rod. This increased forward movement of the sleeve 26 brings the shoulder 22 in front of the forward end of the locking lever, so that the rod 12 is held in position to hold the clutch in engagement until the locking lever is actuated by one of the cranks when the rod is released and the clutch is disengaged by the action of the spring 29.

In order that the rotation of the driving shaft 5 may be uniformly arrested when the driving clutch is disengaged, a friction brake is provided, and this brake is connected so that it is actuated through the movements of the actuating rod 12.

Any suitable form of friction brake may be employed, but it is preferred to employ the form of brake shown in the drawings. As shown, the brake consists of a pulley 32 secured to the shaft 5, and provided with two opposed friction surfaces 33 and 34. Between these surfaces of the pulley, two friction disks 35 and 36 are mounted, and these disks are held from rotation by means of arms 37 which extend on opposite sides of a fixed bar 38. The braking disks 35 and 36 are actuated to apply or relieve the brake by means of an actuating disk 39 mounted between the stationary disks, and carrying a series of balls 40. The disk 35 is provided with recesses 41 having wedge shaped surfaces 42 against which the balls act to force the braking disks apart, when the actuating disk 39 is given a slight movement in the direction of the arrow, Fig. 8. When the actuating disk is moved in the opposite direction, the balls are moved into the deeper parts of the recesses 41, thus relieving the pressure between the brake disks and the friction surfaces on the pulley. The actuating disk is operated to apply and relieve the brake through a lever 43 pivotally mounted on the rod 38, and provided with a pin 44, the head of which engages a slot 45 in the disk 39. The upper end of the lever 43 projects through an opening in a collar 46 adjustably secured upon the actuating rod 12 by means of nuts 47. By means of these connections the brake is applied upon the disengagement of the clutch, and the brake is relieved upon the engagement of the clutch. By means of the adjustable connections between the actuating rod and the clutch and brake operating levers, the relation between the clutch and brake may be accurately regulated to secure the proper action of both the brake and clutch, when the actuating mechanism is operated in starting or stopping the machine.

While it is preferred to employ the specific construction and arrangement of parts shown and described, this construction and arrangement is not essential to the broader features of the invention, and may be varied and modified without departing therefrom.

Having set forth the nature and object of the invention, and specifically described a machine in which it may be embodied, what I claim is:—

1. A starting and stopping mechanism, having, in combination, a clutch, mechanism for manually controlling the engagement and disengagement of the clutch, devices for locking the clutch in engagement, mechanism for automatically operating the locking devices to release the clutch, and means acting when set by the operator to retain the locking devices either in or out of working relation whereby the disengagement of the clutch may be either automatically or manually controlled at the will of the operator, substantially as described.

2. A starting and stopping mechanism, having, in combination, a clutch, a treadle, mechanism for manually controlling the engagement and disengagement of the clutch, devices for locking the treadle mechanism in clutch engaging position, mechanism for automatically operating the locking devices to release the treadle mechanism, and means when set by the operator to retain the locking devices either in or out of working relation whereby the disengagement of the clutch may be either automatically controlled or controlled through the treadle at the will of the operator, substantially as described.

3. A starting and stopping mechanism, having, in combination, a driving mechanism, a starting lever, a crank shaft driven from the driving mechanism, a locking lever operated by a crank on the crank shaft, and a coöperating shoulder connected to move with the starting lever, substantially as described.

4. A starting and stopping mechanism, having, in combination, a starting mechanism, a locking lever, a coöperating shoulder on the starting mechanism, means for varying the relative movement of the lever and shoulder caused in operating the starting mechanism to render the locking devices active or inactive at will, and mechanism for automatically operating the locking lever, substantially as described.

5. A starting and stopping mechanism, having, in combination, a starting treadle, a locking lever, a coöperating shouldered part connected to move with the starting treadle, and means for varying the movement imparted to the shouldered part by the treadle to render the locking lever active or inactive, substantially as described.

6. A starting and stopping mechanism, having, in combination, a starting mechanism including an actuating rod, a locking lever, means for automatically operating the locking lever, a sleeve mounted on the rod and provided with a shoulder for coöperating with the locking lever, a treadle lever connected with the sleeve, and a latching device mounted upon the rod for movement into position to prevent movement of the sleeve with relation to the rod or into position to allow said movement, substantially as described.

7. A starting and stopping mechanism, having, in combination, a starting mechanism including an actuating rod, a sleeve 26 mounted on the rod, a treadle lever 15, a link 30 connecting the sleeve and lever, and a latching lever 31 mounted on the rod in position to be engaged by the treadle lever and movable into position to prevent relative movement between the lever and rod, or into position to allow lost movement between the lever and rod, substantially as described.

8. A starting and stopping mechanism, having, in combination, a clutch mechanism for manually engaging the clutch and disengaging it at any point in its operation, mechanism for automatically disengaging the clutch, means acting when set by the operator to render the automatic mechanism either active or inactive whereby the disengagement of the clutch may be either automatically or manually controlled at the will of the operator, substantially as described.

9. A starting and stopping mechanism, having, in combination, a driving mechanism, mechanism for manually throwing the driving mechanism into and out of operation at any point in its operation, mechanism for automatically throwing the driving mechanism out of operation, and means acting when set by the operator to render the automatic mechanism either active or inactive whereby the disengagement of the clutch may be either automatically or manually controlled at the will of the operator, substantially as described.

10. A starting and stopping mechanism, having, in combination, a driving mechanism, mechanism for manually throwing the driving mechanism into operation and out of operation at any point in its operation, a trip for controlling the throwing out of the driving mechanism, mechanism for automatically operating the trip, and means for rendering the trip active or inactive at the will of the operator, substantially as described.

11. A starting and stopping mechanism, having, in combination, a starting mechanism, a locking device, a coöperating shoulder on the starting mechanism, and means for adjusting the relation of the shoulder and locking device to render the locking device active or inactive, substantially as described.

In testimony whereof I affix my signature, in presence of two witnesses.

AUGUSTUS A. BALL, JR.

Witnesses:
FRED O. FISH,
M. L. GILMAN.